July 21, 1959 R. J. PRICE 2,896,080
BLOCKING OSCILLATOR
Filed June 23, 1955
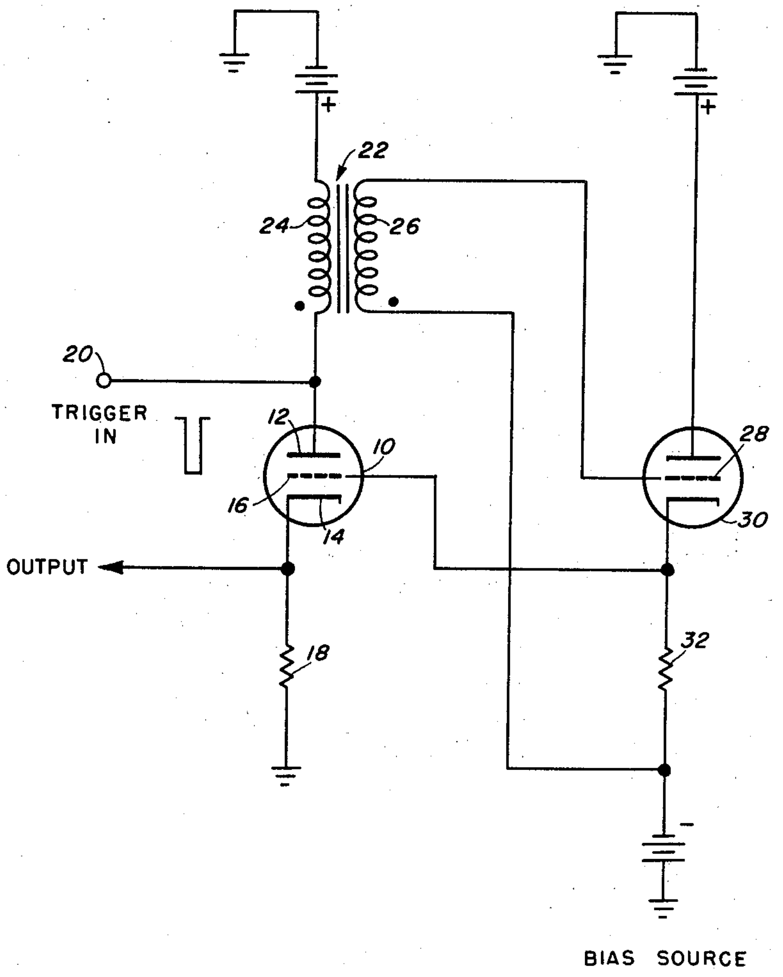
INVENTOR.
ROBERT J. PRICE
BY
George E. Pearson
ATTORNEYS United States Patent Office 2,896,080

Patented July 21, 1959

2,896,080

BLOCKING OSCILLATOR

Robert J. Price, Lakeside, Calif.

Application June 23, 1955, Serial No. 517,669

5 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

This invention relates to blocking oscillators and more particularly to circuitry for reducing the changes in average grid bias supply current drawn by blocking oscillators under conditions of varying pulse frequencies.

The pulse of a blocking oscillator is frequently terminated by the self-biasing grid capacitor which also prevents triggering of the oscillator for a period of time after the pulse. If the oscillator is required to fire at unequal time intervals, the grid capacitor may be either eliminated or made so large that the potential across it is charged negligibly during each pulse so that a constant bias may be maintained by a source of fixed negative potential.

In blocking oscillators incorporating a negative grid bias supply, a pulse of grid current passes to the bias supply when the oscillator tube conducts. The average of this current is a function of the pulse repetition rate and the blocking oscillator pulse width. Circuits which are required to operate intermittently or at different pulse rates must have a low impedance bias source in order to accommodate the concomitant average grid current changes without appreciably changing the bias voltage. Where intermittent triggering is used, the average grid current may vary ten milliamperes or more. This magnitude of change demands excellent regulation of the bias supply which usually means a substantial waste of power.

The present invention obviates these defects by providing a grid current path which bypasses the bias source. The plate of the oscillator tube is regeneratively coupled to the grid thereof through a second tube. The latter is provided with a cathode resistor which couples the bias source to the oscillator grid whereby current drawn by this grid is caused to pass through the second tube rather than to the bias source.

It is an object of this invention to provide an improved blocking oscillator.

A further object of this invention is the provision of a blocking oscillator which may be operated from a bias source of high internal impedance.

Still another object of this invention is to provide a circuit wherein interaction between blocking oscillators using the same bias source is greatly reduced.

Another object of this invention is to reduce the effect of trigger ampltiude upon the output pulse of a blocking oscillator.

A further object of this invention is the elimination from a blocking oscillator of capacitors which affect the recovery time thereof.

Other objects and many of the attendant advantages of this invention will be readily appreciated as the same becomes better understood by reference to the following detailed description when considered in connection with the accompanying drawing which comprises a schematic illustration of a preferred form of the invention.

The triggered or monostable blocking oscillator disclosed herein comprises an electron tube 10 having at least a plate 12, cathode 14, control grid 16, grounded output cathode resistor 18 and an input trigger terminal 20 at the plate thereof.

The primary winding 24 of transformer 22 is connected between plate 12 and a source of positive potential while the secondary winding 26 thereof has its ends respectively connected to a source of negative potential and to the control grid 28 of electronic tube or valve 30. The grid 16 is connected to a point between the cathode of tube 30 and the cathode resistor 32 thereof which has one end connected to the negative bias source. The plate of tube 30 is coupled to a source of positive potential.

In the steady state condition of this monostable oscillator, tube 30 is conducting a small current which may be limited to a fraction of a milliampere by the degenerative cathode bias developed across resistor 32. This steady state current reduces the bias supplied from the negative source to grid 16 by a small amount but the tube 10 is nevertheless biased beyond cut off by the resultant negative potential on its grid. A negative trigger applied at terminal 20 effects a decrease of plate potential of tube 10 and a current through primary 24 which causes an increase in potential at grid 28 because of the indicated polarities of the transformer windings. The positive going swing of grid 28 effects a positive going swing of grid 16 by reason of the increased conduction of tube 30 and the consequent increase in the voltage drop across resistor 32. The increased potential of grid 16 initiates conduction of tube 10 which further decreases the potential at plate 12 and regeneration occurs. The grid voltage and plate current of tube 10 then increase more and more rapidly. Grid 16 becomes positive relative to cathode 14 and grid current from tube 10 flows through the low conductive cathode to plate resistance of tube 30, bypassing the source of negative potential. The increase of current through restistor 32 which takes place during this action may be quite small in view of the relatively large impedance of the resistor. This increased current component includes the small grid current from grid 28 which flows through the secondary 26 and resistor 32. The current through tube 30 during this action also includes the usual large grid current drawn by grid 16. The regenerative action ceases with the termination of the increase in plate current through tube 10 and the voltage on grid 16 stops increasing. The maximum potential of grid 16 may be controlled by the maximum current which can flow through resistor 32. When the potential at plate 12 is no longer decreasing, current through resistor 32 decreases toward its steady state value and the potential at grid 16 starts to decay. As this grid drops, plate current of tube 10 is decreased and a regenerative turnoff commences, terminating in the steady state condition with tube 10 cut off by the resultant bias produced by the negative source and the drop across resistor 32. A positive pulse has appeared across output resistor 18 and the circuit is ready for another triggering pulse, a single output pulse being furnished by the oscillator upon receipt of each triggering pulse.

It will be readily appreciated that the disclosed circuit may be provided with a relatively steady bias from a source of high internal impedance because of the bypassing grid current path. For the same reason several such blocking oscillators may be operated from the same bias source with a minimum of interaction therebetween. The elimination of the usual self biasing grid capacitor obviates the undesirable recovery time required for the discharge of such capacitor. Because the regenerative plate to grid coupling is not direct, but is effected through current changes produced in the second tube 30 the output waveshape of the disclosed oscillator is not as greatly affected by the input trigger amplitude as is that of other blocking oscillator circuits.

While a specific location for input and output has been shown for purposes of exposition, it is apparent that other locations of both input and output may be utilized. For example, any input which effects an increase in plate current or grid potenial would be operable while the output could be taken from a third winding on the transformer as is well known in the art.

Obviously many modifications and variations of the present invention are possible in the light of the above teachings. It is therefore to be understood that within the scope of the appended claims the invention may be practiced otherwise than as specifically described.

What is claimed is:

1. In a blocking oscillator which draws grid current when triggered, an electron tube having a cathode, plate and control grid, a substantially constant source of negative bias for said grid, and means for regeneratively coupling said plate to said grid, said coupling means including a low impedance resistive path for said grid current independent of said bias source, said path comprising an electronic valve having at least a plate, cathode and control grid, said tube grid being directly connected with said valve cathode, and said valve grid being inductively coupled to said tube plate whereby the bias voltage of said source is not appreciably changed by the flow of grid current.

2. In a blocking oscillator which draws grid current when triggered, an electron tube having at least a cathode, plate, and control grid, a substantially constant source of negative bias, nonreactive impedance means coupling said source to said grid, and means including said impedance means for regeneratively coupling said plate to said grid, said regenerative coupling means providing a resistive path for said grid current independent of said bias source.

3. The oscillator of claim 2 wherein said regenerative coupling means includes an electronic valve having at least a cathode, plate, and control grid, said impedance means being connected between said source and said valve cathode, and means for coupling the plate of said tube to the grid of said valve.

4. In a blocking oscillator which draws grid current when triggered, an electron tube having at least a cathode, plate, and control grid, an electronic valve having at least a cathode, plate, and control grid, a substantially constant source of negative potential, resistive means for coupling said source directly to said valve cathode and to said tube grid, and means including said valve and said coupling means regeneratively coupling said tube plate to said valve grid for flow of grid current of said tube through said valve.

5. In a blocking oscillator which draws grid current when triggered, an electron tube having at least a cathode, plate, and control grid, a source of negative bias for said grid, noninductive means for providing a resistive grid current path independent of said bias source, and means including said noninductive means for regeneratively coupling said plate to said grid.

References Cited in the file of this patent

UNITED STATES PATENTS

| | | |
|---|---|---|
| 2,605,424 | Janvrin | July 29, 1952 |
| 2,619,632 | Krumhansl et al. | Nov. 25, 1952 |
| 2,748,282 | Gorski | May 29, 1956 |

OTHER REFERENCES

"Waveforms," by Chance et al., vol. 19, Radiation Laboratory Series, published by McGraw-Hill, pages 220–225 and 234, 235.